(12) United States Patent
Mostafavi et al.

(10) Patent No.: US 10,679,104 B2
(45) Date of Patent: Jun. 9, 2020

(54) FORWARD PROJECTION CYLINDER VOLUME METHOD

(71) Applicant: Varian Medical Systems, Inc., Palo Alto, CA (US)

(72) Inventors: Hassan Mostafavi, Los Altos, CA (US); Alexander Sloutsky, San Mateo, CA (US); Andrew G. Jeung, Mountain View, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 13/662,361

(22) Filed: Oct. 26, 2012

(65) Prior Publication Data

US 2014/0119631 A1 May 1, 2014

(51) Int. Cl.
*G06T 11/00* (2006.01)
*G06T 7/11* (2017.01)
(Continued)

(52) U.S. Cl.
CPC .............. *G06K 9/68* (2013.01); *G06T 7/0012* (2013.01); *G06T 7/248* (2017.01); *G06T 7/11* (2017.01);
(Continued)

(58) Field of Classification Search
CPC ......... G06T 2211/424; G06T 2211/421; G06T 2207/10081; G06T 11/003;
(Continued)

(56) References Cited

U.S. PATENT DOCUMENTS

| | | |
|---|---|---|
| 6,888,919 B2 | 5/2005 | Graf |
| 7,649,981 B2 | 1/2010 | Seppi et al. |
| | (Continued) | |

FOREIGN PATENT DOCUMENTS

| | | |
|---|---|---|
| CN | 101443816 A | 5/2009 |
| DE | 10 2011 003135 A1 | 7/2012 |

OTHER PUBLICATIONS

Crespo et al "On the detector arrangement for in-beam PET for hadron therapy monitoring" 2006 Physics in Medicine and Biology vol. 51.*

(Continued)

*Primary Examiner* — Kenny A Cese
(74) *Attorney, Agent, or Firm* — Vista IP Law Group, LLP

(57) ABSTRACT

A method of generating a template image includes: receiving an input from a user representing identifications of an object in different respective slices of a volumetric image; using the input to determine a volume-of-interest (VOI) that includes voxels in a subset of the volumetric image; and determining the template image using at least some of the voxels in the VOI, wherein the act of determining the template image comprises performing a forward projection of the at least some of the voxels in the VOI using a processor. An image processing method includes: obtaining a volumetric image; performing forward projection of voxels in the volumetric image from different positions onto a first plane using a processor; and summing projections on the first plane resulted from the forward projection from the different positions to create a first image slice in the first plane.

18 Claims, 11 Drawing Sheets

(51) Int. Cl.
*G06K 9/68* (2006.01)
*G06T 7/00* (2017.01)
*G06T 7/246* (2017.01)

(52) U.S. Cl.
CPC ... *G06T 11/003* (2013.01); *G06T 2207/10112* (2013.01); *G06T 2207/20104* (2013.01); *G06T 2207/30052* (2013.01); *G06T 2207/30096* (2013.01); *G06T 2207/30204* (2013.01)

(58) Field of Classification Search
CPC .......... G06T 2207/30004; G06T 15/08; G06T 5/002; G06T 5/003; G06T 2207/10072; G06T 2207/10112; G06T 2207/10116; G06T 2210/41; G06T 7/11; G06T 7/0012; G06T 7/248; A61B 6/032; A61B 6/025; A61B 6/469; G06K 9/68
See application file for complete search history.

(56) References Cited

U.S. PATENT DOCUMENTS

| | | | |
|---|---|---|---|
| 7,711,087 | B2 | 5/2010 | Mostafavi |
| 2007/0237290 | A1* | 10/2007 | Mostafavi .............. A61B 6/025 378/21 |
| 2007/0239290 | A1* | 10/2007 | Nussbaum ......... G06K 7/10851 700/77 |
| 2007/0297660 | A1* | 12/2007 | Hsieh ..................... A61B 6/032 382/131 |
| 2008/0063238 | A1 | 3/2008 | Wiedemann |
| 2009/0087062 | A1* | 4/2009 | Chu ...................... G06T 11/005 382/131 |
| 2010/0014730 | A1* | 1/2010 | Hahn ........................ G06T 5/50 382/131 |
| 2010/0158385 | A1 | 6/2010 | Jeung |
| 2010/0228340 | A1 | 9/2010 | Erbel et al. |
| 2011/0052021 | A1* | 3/2011 | Noo et al. ...................... 382/131 |
| 2011/0058647 | A1* | 3/2011 | Star-Lack .............. A61B 6/027 378/23 |
| 2011/0058723 | A1* | 3/2011 | Jandt ..................... G06T 11/005 382/131 |
| 2011/0081071 | A1* | 4/2011 | Benson ................. G06T 11/005 382/154 |
| 2011/0129057 | A1 | 6/2011 | Paul et al. |
| 2012/0213327 | A1* | 8/2012 | Boas ..................... G06T 11/005 378/5 |
| 2013/0223710 | A1* | 8/2013 | Suppes ................. G06T 11/008 382/131 |
| 2014/0140601 | A1* | 5/2014 | Litvin ................... G06T 11/005 382/131 |

OTHER PUBLICATIONS

Non-final Office Action dated Apr. 10, 2014 for U.S. Appl. No. 13/662,365.
Axelsson, "Image Analysis for Volumetric Characterisation of Microstructure", 2009, Swedish University of Argicultural Sciences.
Razifar, "Novel Approaches for Application of Principal Component Analysis on Dynamic PET Images for Improvement of Image Quality and Clinical Diagnosis", 2005, Uppsala Universitet, Digital Comprehensive Summeries of Uppsala Dissertations from the Faulty of Science and Technology.
Supplementary EP Search Report dated Feb. 24, 2014 for EP Patent Application No. EP 13188059.3.
Sook Ng et al., "Optimal parameters for clinical implementation of breast cancer patient setup using Varian DTS software" Journal of Applied Clinical Medical Physics, vol. 13, No. 3, Jan. 1, 2012, XP055101132.
Standard Imaging et al, "PipsPro Software, Version 4.1, User Manual" Internet Citation, XP007903719, url: www.standardimaging.com/product/home.php?id=14>, retreived Dec. 17, 2007.
Dobbins J T et al., "Digital x-ray tomosynthesis: current state of the art and clinical potential" Physics in Medicine and Biology, Institute of Physics Publishing, Bristol GB, vol. 48, No. 19, Oct. 7, 2003, XP002277335.
Kolitsi Z et al., "A Method for Selective Removal of Out-Of-Plane Sturctures in Digital Tomosynthesis", Medical Physics, AIP, Melville, NY, US. vol. 20, No. 1, Jan. 1, 1993, XP000345801.
Extended EP Search Report dated Feb. 26, 2014 for EP Patent Application No. 13188052.8.
Mostafavi H et al., "Detection and localization of radiotheraphy targets by template matching", Engineering in Medicine and Biology Society (EMBC), 2012 Annual International Conference of the IEEE, IEEE, Aug. 28, 2012.
I Pitas, "Digital Image Processing Algorithims and Applications" In: "Digital Image Processing Algorithms and Applications", Jan. 1, 2000, John Wiley & Sons, Inc. , XP055101657.
Sternberg S R, "Grayscale Morphology" Computer Vision Graphics and Image Processing, Academic Press, Duluth, MA, US vol. 35, No. 3, Sep. 1, 1986.
Per Rugaard Poulsen et al., "A method for robust segmentation of arbitrarily shaped radiopaque structures in cone-beam CT projections", Med. Phys. 38 (4), Apr. 2011, 6 pages.
W. Mao et al., "Fast internal marker tracking algorithm for onboard MV and kV imaging systems", Med. Phys. 35 (5), May 2008, 8 pages.
Anne Richter et al., "Feasibility Study for Markerless Tracking of Lung Tumors in Stereotactic Body Radiotheraphy", Int. J. Radiation Oncology Biol. Phys., vol. 78, No. 2, 2010, 10 pages.
Final Office Action dated Sep. 8, 2014 for U.S. Appl. No. 13/662,365.
Notice of Allowance and Fees Due dated Dec. 3, 2014 for U.S. Appl. No. 13/662,365.
Notification of the First Office Action dated Mar. 21, 2016 for corresponding Chinese Patent Application No. 201310513573.X, 7 pages.
Intention to Grant dated Feb. 3, 2017 for related EP Patent Application No. 13188052.8, 7 pages.
Communication pursuant to Article 94(3) EPC dated Feb. 28, 2017 for corresponding EP Patent Application No. 13 188 059.3, 6 pages.
Notification of the Second Office Action dated Nov. 30, 2016 for corresponding Chinese Patent Application No. 201310513573X, 15 pages.
Fourth Office Action dated Jan. 2, 2018 for related Chinese Patent Application No. 201310513573X, 10 pages.
Notification of the First Office Action and Search Report dated Apr. 17, 2017 for related Chinese Patent Application No. 201310514212. 7, 13 pages.
Notification of Third Office Action dated May 10, 2017 for corresponding Chinese Patent Application No. 201310513573X, 10 pages.
Extended EP Search Report dated Jul. 26, 2017 for corresponding/related EP Patent Application No. 17171802.6, 12 pages.

* cited by examiner

FORWARD PROJECTION CYLINDER VOLUME METHOD

FIELD

This application relates generally to imaging, and more particularly, to systems and methods for segmentation of radiopaque structures in images.

BACKGROUND

Radiotherapy has been used in the treatment of tumors, such as tumors in lung and abdomen. Implanted markers, such as radio opaque fiducials, have been used in radiotherapy for target localization. In particular, in radiotherapy, precise delivery of the treatment dose is crucial in order to maximize the ratio between tumor dose and normal tissue dose. To achieve this goal x-ray visible markers may be implanted in or near a tumor. It allows use of the projected marker trajectory in x-ray images for image-guided radiotherapy (IGRT).

Sometimes, a marker may not have the simple shape such as the gold cylinder or BB. One example of such marker is the thin flexible Visicoil™ markers that are implanted in or around a tumor in anatomical sites such as lung, liver, and pancreas for the purpose of IGRT. The main advantage of Visicoil™ is reduced invasiveness due to its small diameter and less chance of migration in soft tissue because they are designed to coil up and engage the surrounding tissue after being implanted in the form of a straight wire. However because of the variability of the surrounding tissue, instead of completely coiling up, the marker may assume an irregular and unpredictable shape after being implanted in the anatomical three-dimensional space. In some cases, robust tracking of the fiducial can be a challenge because it shows up in varying extended shapes in the X-ray projections acquired from different orientations.

SUMMARY

In accordance with some embodiments, an image processing method includes: obtaining an input image; enhancing an object in the input image; and after the input image is enhanced, applying a low-pass filter using a processor to obtain a processed image.

In accordance with other embodiments, a computer product includes a non-transitory medium storing a set of instructions, an execution of which causes a method to be performed, the method comprising: obtaining an input image; enhancing an object in the input image; and after the input image is enhanced, applying a low-pass filter to obtain a processed image.

In accordance with other embodiments, a method of generating a template image includes: receiving an input from a user representing identifications of an object in different respective slices of a volumetric image; using the input to determine a volume-of-interest (VOI) that includes voxels in a subset of the volumetric image; and determining the template image using at least some of the voxels in the VOI, wherein the act of determining the template image comprises performing a forward projection of the at least some of the voxels in the VOI using a processor.

In accordance with other embodiments, a computer product includes a non-transitory medium storing a set of instructions, an execution of which causes a method to be performed, the method comprising: receiving an input from a user representing identifications of an object in different respective slices of a volumetric image; using the input to determine a volume-of-interest (VOI) that includes voxels in a subset of the volumetric image; and determining a template image using at least some of the voxels in the VOI, wherein the act of determining the template image comprises performing a forward projection of the at least some of the voxels in the VOI.

In accordance with other embodiments, an image processing method includes: obtaining a volumetric image; performing forward projection of voxels in the volumetric image from different positions onto a first plane using a processor; and summing projections on the first plane resulted from the forward projection from the different positions to create a first image slice in the first plane.

In accordance with other embodiments, a computer product includes a non-transitory medium storing a set of instructions, an execution of which causes a method to be performed, the method comprising: obtaining a volumetric image; performing forward projection of voxels in the volumetric image from different positions onto a first plane using a processor; and summing projections on the first plane resulted from the forward projection from the different positions to create a first image slice in the first plane.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
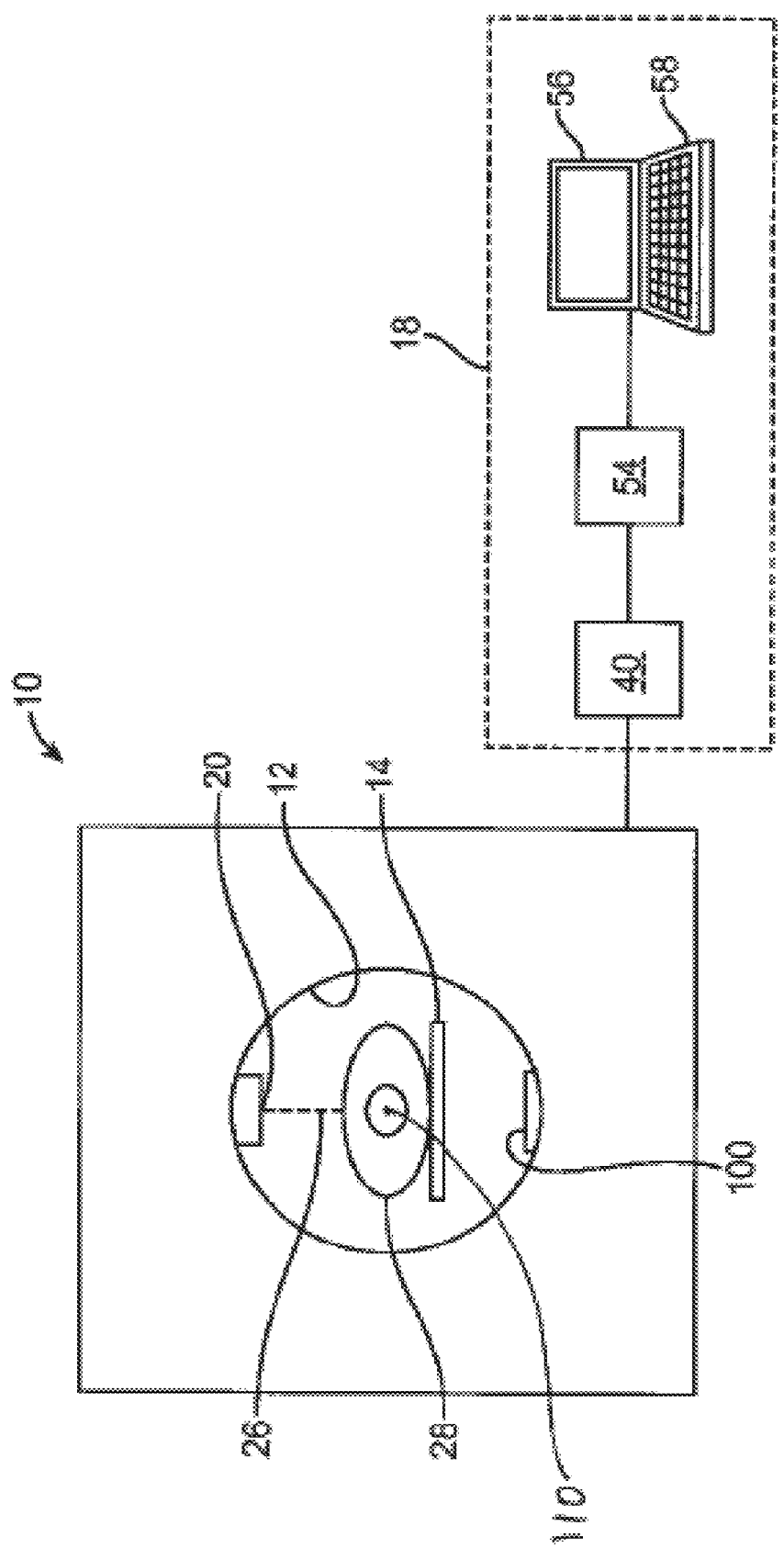
FIG. 1 illustrates a radiation system that may be used to implement one or more embodiments described herein.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated.

FIG. 1 illustrates a radiation system 10 that may be used to implement one or more embodiments described herein. The system 10 includes a gantry 12, a patient support 14 for supporting a patient 28, and a control system 18 for controlling an operation of the gantry 12. The system 10 also includes a radiation source 20 that projects a beam 26 of radiation towards the patient 28 while the patient 28 is supported on support 14, and an imager 100 located at an operative position relative to the source 20 (e.g., under the support 14). The radiation source 20 can be configured to generate a cone beam, a fan beam, or other types of radiation beams in different embodiments.

In the illustrated embodiments, the radiation source 20 is a diagnostic radiation source for providing diagnostic energy. In such cases, the imager 100 is configured to receive diagnostic radiation and generate image signals in response thereto. In other embodiments, in addition to being a diagnostic radiation source, the radiation source 20 is also a treatment radiation source for providing treatment energy. In such cases, the imager 100 is configured to selectively receive diagnostic radiation or treatment radiation and generate image signals in response thereto. In further embodiments, instead of being a diagnostic radiation source, the radiation source 20 is a treatment radiation source. In such cases, the imager 100 is configured to receive treatment radiation and generate image signals in response thereto. In the embodiments in which the radiation source 20 is configured to deliver treatment radiation, the system 10 may optionally further include a collimator for changing a characteristic (e.g., shape) of the radiation beam.

In some embodiments, the treatment energy is generally those energies of 160 kilo-electron-volts (keV) or greater, and more typically 1 mega-electron-volts (MeV) or greater, and diagnostic energy is generally those energies below the high energy range, and more typically below 160 keV. In other embodiments, the treatment energy and the diagnostic energy can have other energy levels, and refer to energies that are used for treatment and diagnostic purposes, respectively. In some embodiments, the radiation source 20 is able to generate X-ray radiation at a plurality of photon energy levels within a range anywhere between approximately 10 keV and approximately 20 MeV. Radiation sources capable of generating X-ray radiation at different energy levels are described in U.S. patent application Ser. No. 10/033,327, entitled "RADIOTHERAPY APPARATUS EQUIPPED WITH AN ARTICULABLE GANTRY FOR POSITIONING AN IMAGING UNIT," filed on Nov. 2, 2001, and U.S. patent application Ser. No. 10/687,573, entitled "MULTI-ENERGY X-RAY SOURCE," filed on Oct. 15, 2003. In the illustrated embodiments, the radiation source 20 is coupled to a ring gantry and is located within a bore. In other embodiments, the radiation source 20 may be coupled to an arm gantry.

In the illustrated embodiments, the control system 18 includes a processor 54, such as a computer processor, coupled to a control 40. The control system 18 may also include a monitor 56 for displaying data and an input device 58, such as a keyboard or a mouse, for inputting data. In the illustrated embodiments, the gantry 12 is rotatable about the patient 16, and during an imaging and/or a treatment procedure, the gantry 12 rotates about the patient 28 (as in a CT procedure and/or an arch-therapy). In other embodiments, the gantry 12 does not rotate about the patient 28 during a procedure. In such case, the gantry 12 may be fixed, and the patient support 14 is rotatable. The operation of the radiation source 20 and the gantry 12 (if the gantry 12 is rotatable) are controlled by the control 40, which provides power and timing signals to the radiation source 20, and controls a rotational speed and position of the gantry 12, based on signals received from the processor 54. Although the control 40 is shown as a separate component from the gantry 12 and the processor 54, in alternative embodiments, the control 40 can be a part of the gantry 12 or the processor 54.

It should be noted that the system 10 is not limited to the example described above, and that the system 10 may have other configurations in other embodiments. For example, in other embodiments, the system 10 may have different shapes. In other embodiments, the system 10 may have different ranges of motions and/or degrees of freedom. For example, in other embodiments, the radiation source 20 may be rotatable about the patient 28 completely through a 360° range, or partially through a range that is less than 360°. Also, in other embodiments, the radiation source 20 is translatable relative to the patient 28. In still further embodiments, the system 10 may be any imaging system that has imaging capability.

Figure 2:
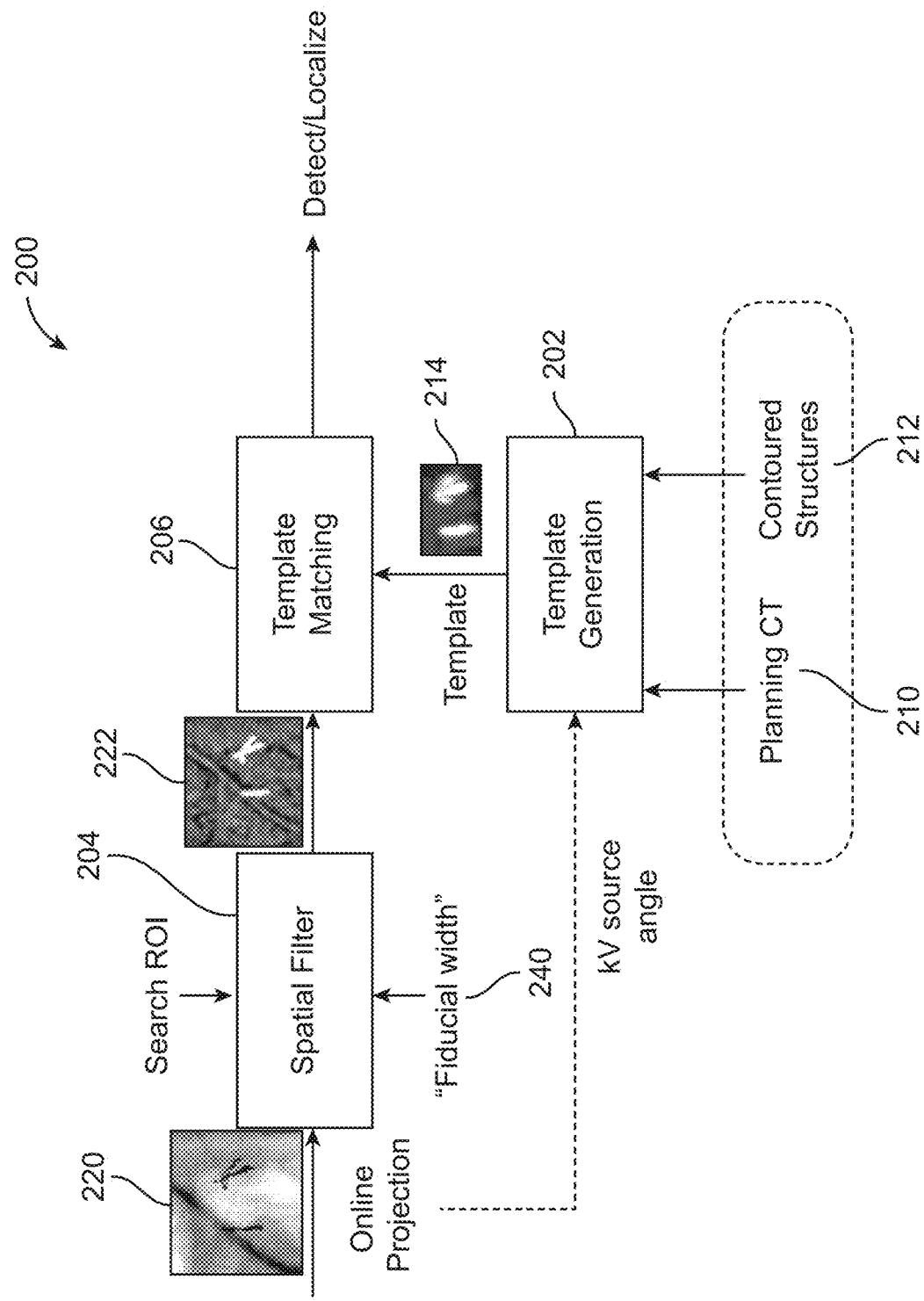
FIG. 2 is a flow diagram illustrating a method for template matching in accordance with some embodiments.

FIG. 2 is a flow diagram illustrating a method 200 for template matching in accordance with some embodiments. The method 200 includes a template generation process 202, an imaging process 204, and a template matching process 206.

As shown in the figure, in the template generation process 202, a volumetric image 210 (such as, a CT image) and information 212 regarding contoured structure(s) are used to provide one or more template images 214. In the illustrated embodiments, the volumetric image 210 may be obtained from a planning session. In other embodiments, the volumetric image 210 may be obtained during a diagnostic session, or a treatment session. In some embodiments, the volumetric image 210 may have a pixel resolution of 1 mm or less than 1 mm. In other embodiments, the volumetric image 210 may have a pixel resolution greater than 1 mm. Also, in some embodiments, the slices of the volumetric image 210 may have a spacing that is 2.5 mm or less, and more preferably 1.25 mm or less.

The information 212 regarding contoured structure(s) may be obtained from a physician or a technician, who provides contour(s) around object(s) of interest in the image 210. In some embodiments, the information 212 regarding the contoured structure(s) may be the contour(s) drawn by a person who reviewed the image 210, and/or data regarding the contour(s). In other embodiments, instead of obtaining the information 212 from a person (user) who inputs the information 212, the information 212 may be obtained from a device. For example, the person reviewing the image 210 may input the information regarding the contoured structure(s) into a device through a user interface, wherein the device may be a computer, a handheld device, a storage device, or any of other types of device that is capable of receiving data. In such cases, the information 212 may be obtained by retrieving the stored information 212 from the device.

In the imaging process 204, an input image 220 is used to generate a processed image 222. In some embodiments, the input image 220 may be an image obtained before a treatment session, such as during a patient setup. In other embodiments, the input image 220 may be obtained during a treatment session, such as during an activation of a radiation beam, or between delivery of radiation beams. In some cases, the input image 220 may be an online image, such as an online projection image. In the illustrated embodiments, the imaging process 204 may involve one or more spatial filters that are applied to the input image 220 to generate the processed image 222. In some embodiments, one of the spatial filters may be configured (e.g., at least partially defined) by a user input 240, such as a fiducial width. Also, in some embodiments, the input image 220 may be a subset of the original image. For example, the input image 220 may be a region of interest (ROI) that is within the original input image. The ROI may be selected manually by a user who reviews the input image. In some embodiments, the ROI may be determined automatically as a search area expanded by dimensions (e.g., x-dimension and y-dimension) of the template image 214. The search area in the input image 220 may be centered at an expected target position, and may have dimensions that correspond with motion margins. In some cases, the expected target position may be determined from planning data. For example, the planning data may include information regarding a treatment isocenter position, and contoured structures representing a treatment volume. Also, in some cases, the motion margins may be obtained from planning data. For example, there may be a 4D CT of the tumor, which shows the extent of its motion. In other embodiments, the input image 220 may be the entire original image.

In the template matching process 206, the processed input image 222 and the template image(s) 214 are processed to determine whether there is a match, and if so, determine a position of an object based on the match.

Figure 3:
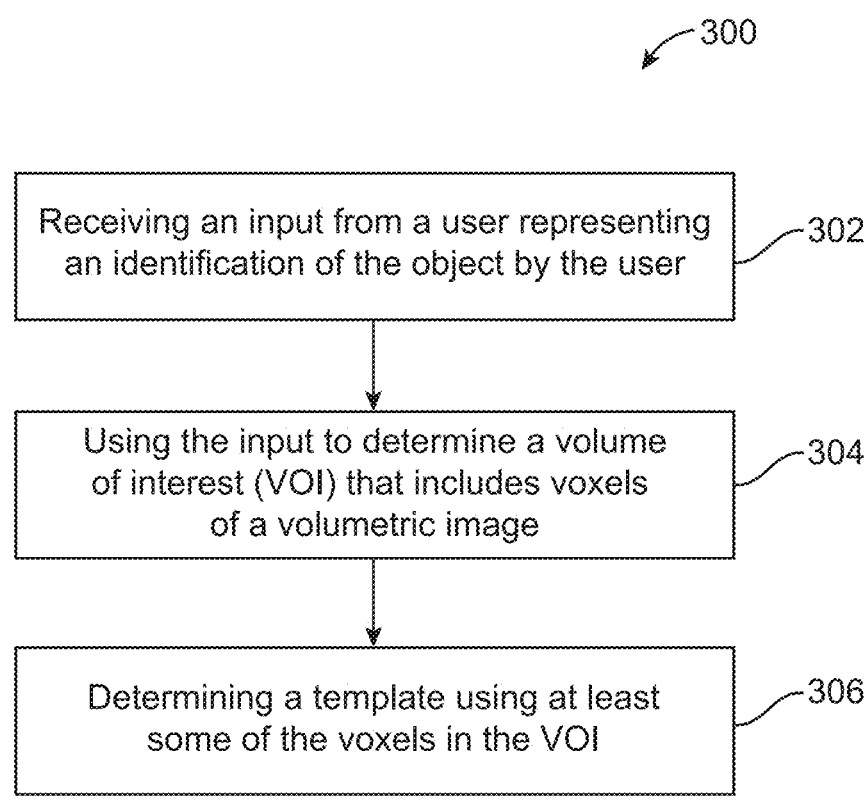
FIGS. 3-4 illustrate a method of generating a template in accordance with some embodiments.
Figure 4:
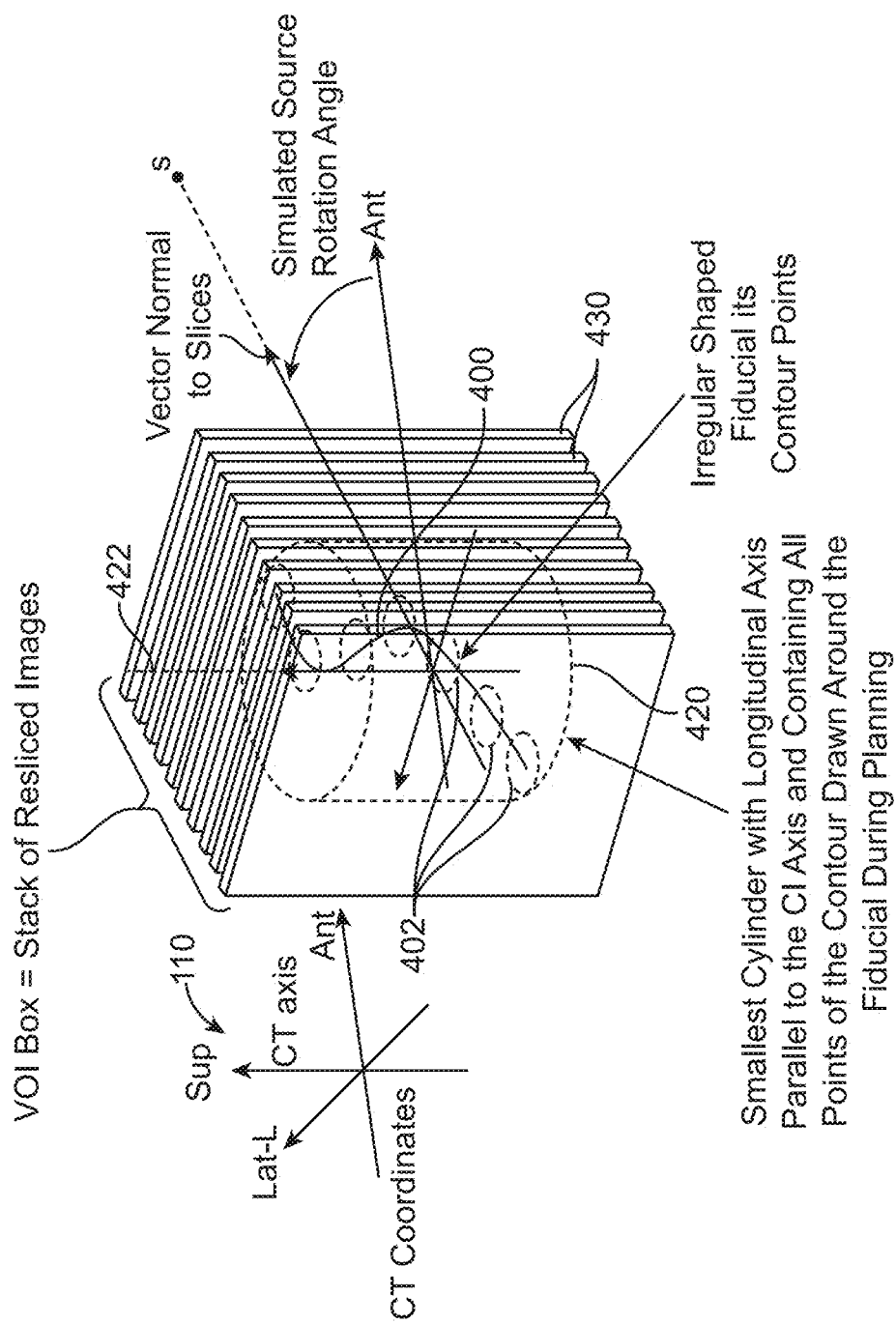

FIGS. 3-4 illustrate a method 300 of generating a template (such as the template image 214 of FIG. 2) in accordance with some embodiments. The method 300 may be used to implement the template generation process 202 of FIG. 2 in some embodiments. As shown in FIG. 3, the method 300 includes receiving an input from a user representing an identification of the object by the user (Item 302). In some embodiments, the user may examine a volumetric image (such as one or more slices of the volumetric image 210 in FIG. 2) to identify object(s) of interest. The user may then create a contour around an object of interest by some means, such as by using a graphical user interface. In some embodiments, the created contour and/or data associated therewith may be an example of the input 212 shown in FIG. 2. In some cases, the volumetric image 210 may include an image of an irregularly-shaped marker 400 (FIG. 4). In such cases, the user may examine different slices of the volumetric image 210 to identify the marker 400 as it appears in the different slices, and then draw a contour 402 around the marker 400 in each of the different slices of the volumetric image 210. In some embodiments, item 302 in the method 300 of FIG. 3 may be accomplished by a device (e.g., a processor, such as the processor 54, or another processor) receiving the input from the user that represents the identification of the object (e.g., marker 400). In other embodiments, the user input 212 representing the identification of the object may be stored in a device, and item 302 may be accomplished by the same device that stores the input 212 (e.g., the device itself may retrieve the stored input 212). In further embodiments, the user input 212 representing the identification of the object mat be stored in a first device, and item 302 may be accomplished by a second device that retrieves the stored input 212 from the first device.

Returning to FIG. 3, next, in the method 300, the input (e.g., the input 212) obtained from item 302 is used by a processor (e.g., the processor 54, or another processor) to determine a volume-of-interest (VOI) that includes voxels of the volumetric image (Item 304). In some embodiments, the VOI includes the voxels that are within the contour(s) 402 drawn by the user in each of the slices of the volumetric image 210. Also, in some embodiments, the VOI may include additional voxels that are outside the contour(s) 402. For example, in some embodiments, the VOI may include voxels from the volumetric image 210 that are a certain prescribed distance from the drawn contour(s) 402. In other embodiments, the VOI may include voxels from the volumetric image 210 that are within a defined three-dimensional spatial geometry. For example, as shown in FIG. 4, a cylindrical geometry 420 (an example of the VOI) may be defined based on the contour(s) 402, such that all of the voxels within the contour(s) 402 are within the cylindrical geometry 420. In some cases, the cylindrical geometry 420 may further be defined as having a circular cross section, and a longitudinal axis 422 that is perpendicular to the circular cross section and that is parallel to (or aligned with) a rotational axis of a gantry of an imaging device (e.g., the rotational axis 110 in the system 100 of FIG. 1). In other embodiments, the three-dimensional spatial geometry may have different shapes from the cylindrical geometry. Also, in other embodiments, the three-dimensional spatial geometry may be defined using other criteria.

Returning to the method 300 of FIG. 3, next, the processor determines (e.g., calculates, generates, derives, etc.) a template (such as the template image 214 in FIG. 2) using at least some of the voxels in the VOI 420 (Item 306). In some embodiments, the determination of the template may be accomplished by a processor (e.g., processor 54, or another processor) performing a forward projection of the at least some of the voxels in the VOI 420. By means of non-limiting examples, the forward projection may be a forward maximum intensity projection, a forward average projection, or a forward median projection, of the at least some of the voxels in the VOI 420. In some embodiments, before the forward projection is performed, the processor may also resample voxels in the VOI 420 into image planes 430 that are parallel to a plane of the input image (e.g., input image 220). Thus, the resampling of the voxels in the VOI 420 may be based on the orientation of the input image 220. In such cases, depending the gantry angle at which the input image 220 is generated, the orientation of the image planes 430 for the resampling of the voxels may be adjusted to correspond with the orientation of the input image 220.

As shown in the above embodiments, defining the VOI 420 is advantageous because it limits the number of voxels for processing (e.g., forward projection) to be a certain subset of the original volumetric image. This, in turn, results in the template image 214 having a dimension that corresponds to the defined VOI 420. Accordingly, the resulting template image 214 will have a dimension that covers the object(s) of interest, while other objects outside the VOI 420 will be excluded from being included in the template image 214. This is also advantageous in that it limits the template image 214 to have a size that is large enough for covering the object(s) of interest for tracking purpose. In some embodiments, the sizing of the template image 214 is determined and accomplished automatically by the processor (e.g., the processor 54, or another processor) based on the input 212 from the user.

In some embodiments, the template image 214 determined from item 306 may be stored in a non-transitory medium for later processing. Alternatively or additionally, the template image 214 may be displayed in a screen for allowing a user to see. Also, in some embodiments, the processor (e.g., the processor 54, or another processor) may determine a plurality of template images 214 using the above technique for different gantry angles. For example, the processor may determine a set of template images 214 that correspond to 120 gantry angles with 3° spacing. In one implementation, the processor may generate only half the number of template images 214 (e.g., covering 180° range), and then generates the rest by flipping the template images 214 horizontally. The template images 214 may be stored in a non-transitory medium for later processing, and/or displayed in a screen for allowing a user to see. Furthermore, in some embodiments, any parameters and/or input that are involved in the method 300 may be stored in a non-transitory medium for later retrieval and/or processing. For examples, parameters and/or input that are used to define the VOI 420 may be stored in a non-transitory medium in some embodiments.

Figure 5:
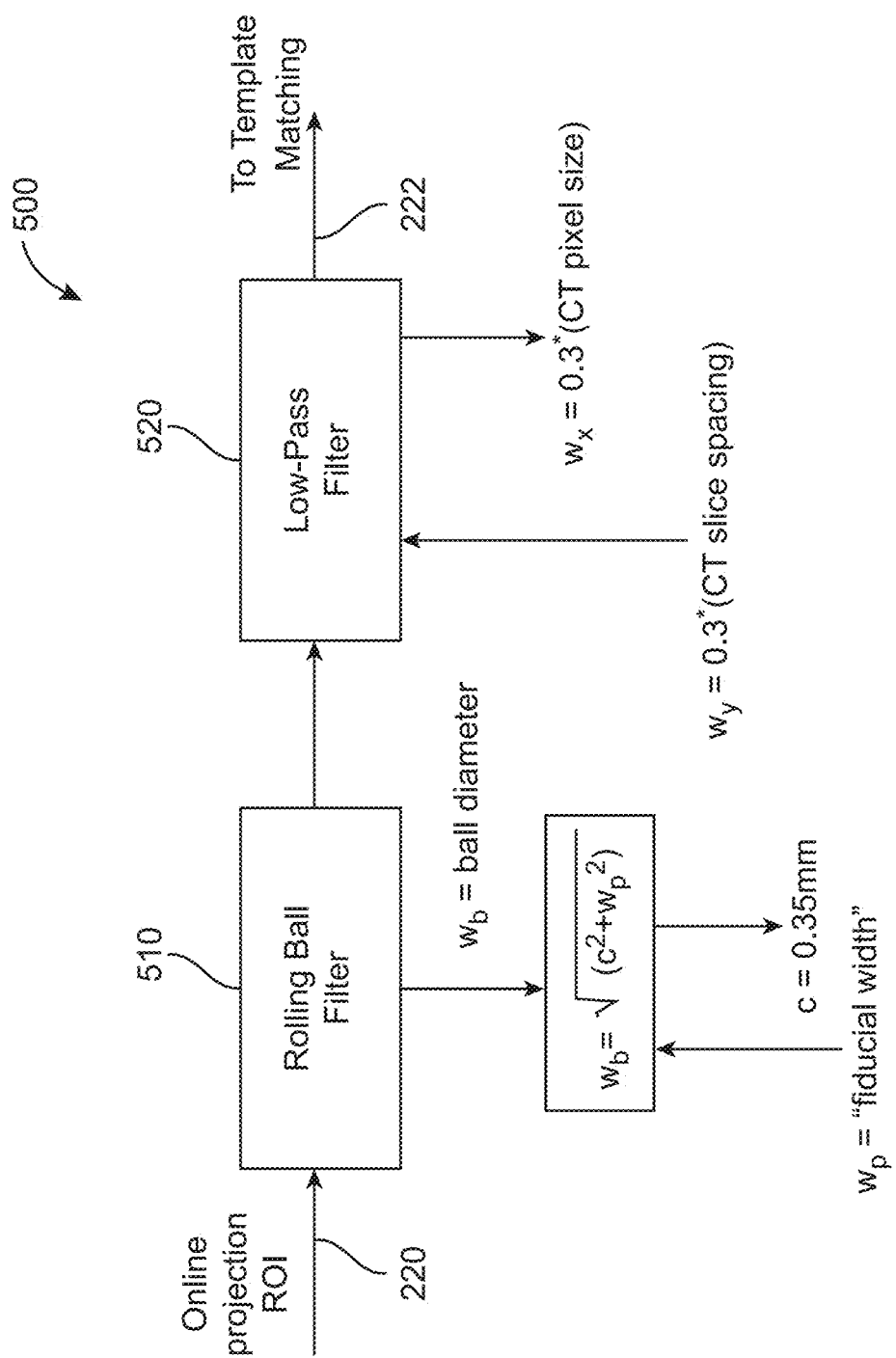
FIG. 5 illustrates a method of processing an input image in accordance with some embodiments.

Returning to FIG. 2, as discussed, the method 200 for template matching also includes the imaging process 204, which involves obtaining the input image 220, and processing the input image 220 to obtain the processed image 222. In some embodiments, the input image 220 is processed into the processed image 222 so that the processed image 222 has a desirable feature for comparison with the template image 214. Various techniques may be employed to process the input image 220 so that it has a desirable feature for comparison with the template image 214. In some embodiments, the processing of the input image 220 may involve applying a first spatial filter and a second spatial filter to the input image 220 to obtain the processed image 222. FIG. 5 illustrates a method 500 for processing the input image 220 in accordance with some embodiments. As shown in the figure, a first filter 510 may be applied to the input image 220 to enhance an object in the input image 220. After the first filter 510 has been applied, a second filter 520 may be applied so that the processed image 222 has a degree of resolution that corresponds (e.g., matches or closely resembles) with that of the template image 214.

In the illustrated embodiments, the first filter 510 is a rolling ball filter. In one implementation, a rolling ball filter may be defined at least partially by a ball diameter $w_b=(c^2+w_p^2)^{1/2}$, wherein $w_p$ is a fiducial width (e.g., a width, such as a cross sectional dimension, of the marker 400), and c may be any constant. In some embodiments, $w_p$ may be 0.35 mm for a Visicoil wire that is not coiled up, or may be 2.0 mm for a Visicoil wire that is coiled up. In other embodiments, $w_p$ may be 3.0 mm for a coiled up embolization coil. In further embodiments, $w_p$ may be a diameter of a cylindrical gold seed, such as 0.8 mm. It should be noted that $w_p$ should not be limited to the above examples, and that $w_p$ may have other values that are different from the above examples. Also, in some embodiments, c may be a value that is anywhere between 0.1 mm and 1 mm, and more preferably, between 0.2 mm and 0.5 mm, and more preferably, between 0.3 mm and 0.4 mm (e.g., 0.35 mm). In other embodiments, c may be other values different from those described. In some embodiments, the rolling ball filter may be applied to the input image 220 to enhance an object (e.g., the marker 400, or a tissue structure) relative to its surrounding objects. In other embodiments, the rolling ball filter may be applied to the input image 220 to enhance a boundary of the object (e.g., a boundary of tissue structure).

Also, in the illustrated embodiments, the second filter 520 is a low-pass filter. In one implementation, the low-pass filter may be defined at least partially by two parameters $w_x$, $w_y$. The parameter $w_x$ is used to configure the input image 220 so that the processed image 222 has a resolution in the x-direction that corresponds with a pixel size of the volumetric image 210 (that was used to generate the template image 214). The parameter $w_y$ is used to configure the input image 220 so that the processed image 222 has a resolution in the y-direction that corresponds with a slice spacing of the volumetric image 210 (that was used to generate the template image 214). In some embodiments, $w_x$ may be determined as a constant (e.g., 0.3, or any of other values) times a pixel size in the volumetric image 210. Also, in some embodiments, $w_y$ may be determined as a constant (e.g., 0.3, or any of other values) times a slice spacing of the volumetric image 210. Furthermore, in some embodiments, the low-pass filter may be a Gaussian shaped low-pass filter. In one implementation, the Gaussian shaped low-pass filter may be specified by 1 standard deviation widths in the x-direction and the y-direction with respect to the input image 220.

It should be noted that there may be other parameter(s) for defining the low-pass filter in other embodiments. For examples, in addition/alternative to the parameters described above, other filter parameter(s) may include SAD, SDD, detector pixel size, or combination thereof.

In other embodiments, each of the first filter 510 and the second filter 520 may be any of other types of filters that are different from the examples described.

Returning to FIG. 2, after the input image 220 has been processed to provide the processed image 222, and after the template image(s) 214 has been obtained, the processed image 222 may then be compared with the template image (s) 214 in the template matching process 206. In some embodiments, the input image 220 may be obtained by a processor (e.g., the processor 54, or another processor) receiving the input image 220 from an imager or a storage device. Such may be accomplished before a treatment session, as in a patient setup, in which cases, the processed image 222 may be compared with the template image 214 to identify object(s) of interest for positioning the patient. In other embodiments, the processed image 222 may be obtained, and the comparison between the processed image 222 and the template image 214 may be performed, during a treatment session between deliveries of radiation beams. In such cases, the processed image 222 may be used to reposition the patient between deliveries of radiation beams. In further embodiments, the processed image 222 may be obtained, and the comparison between the processed image 222 and the template image 214 may be performed, during a delivery of a radiation beam. In such cases, the result of the comparison between the processed image 222 and the template image 214 may be used for substantially real-time tracking of the object(s) of interest.

In some embodiments, when comparing the processed image 222 and the template image 214, the processor determines the template image 214 having a plane that is parallel to the plane of the processed image 222. Thus, in some embodiments, the template image 214 (that is used for comparison with the processed image 222) is the one derived from resampled voxels that lie in the image planes 430 having an orientation that is parallel to the plane of the processed image 222 or the input image 220 (see FIG. 4). As discussed, in some embodiments, the processor may generate a set of template images 214 that correspond with different gantry angles ahead of time, and stores the template images 214 in a non-transitory medium. In such cases, during the template matching process 206, the processor selects the template image 214 from the set having a gantry orientation that corresponds (e.g, that is the same, or the closest) with the gantry orientation at which the input image 220 is obtained.

In other embodiments, for each input image 220, the processor may select several template images 214 covering gantry angles that are adjacent to the gantry angle at which the input image 220 is generated. For example, if the input image 220 is generated at a gantry angle of 30°, in addition to selecting the template image 214 having a corresponding gantry angle of 30°, the processor may also select the template images 214 having corresponding gantry angles that are within a prescribed range from 30° (e.g., template images 214 that are within gantry angles 30°±10°). Such technique is advantageous because the object of interest may have rotated slightly since the time the template images 214 were generated. Checking other gantry angles allows such rotation to be accounted for when trying to find a template image 214 that best match the input image 220/processed image 222. Also, in some embodiments, the above technique may provide a way to estimate an amount of rotation.

Various techniques may be employed to compare the processed image 222 with the template image 214. For example, a processor (e.g., the processor 54, or another processor) may be configured to perform cross correlation, normalized cross correlation, or mutual information, between the processed image 222 and the template image 214 in different embodiments. Also, in some embodiments, the processor may be configured to determine a degree of similarity between the processed image 222 and the template image 214.

Figure 6:
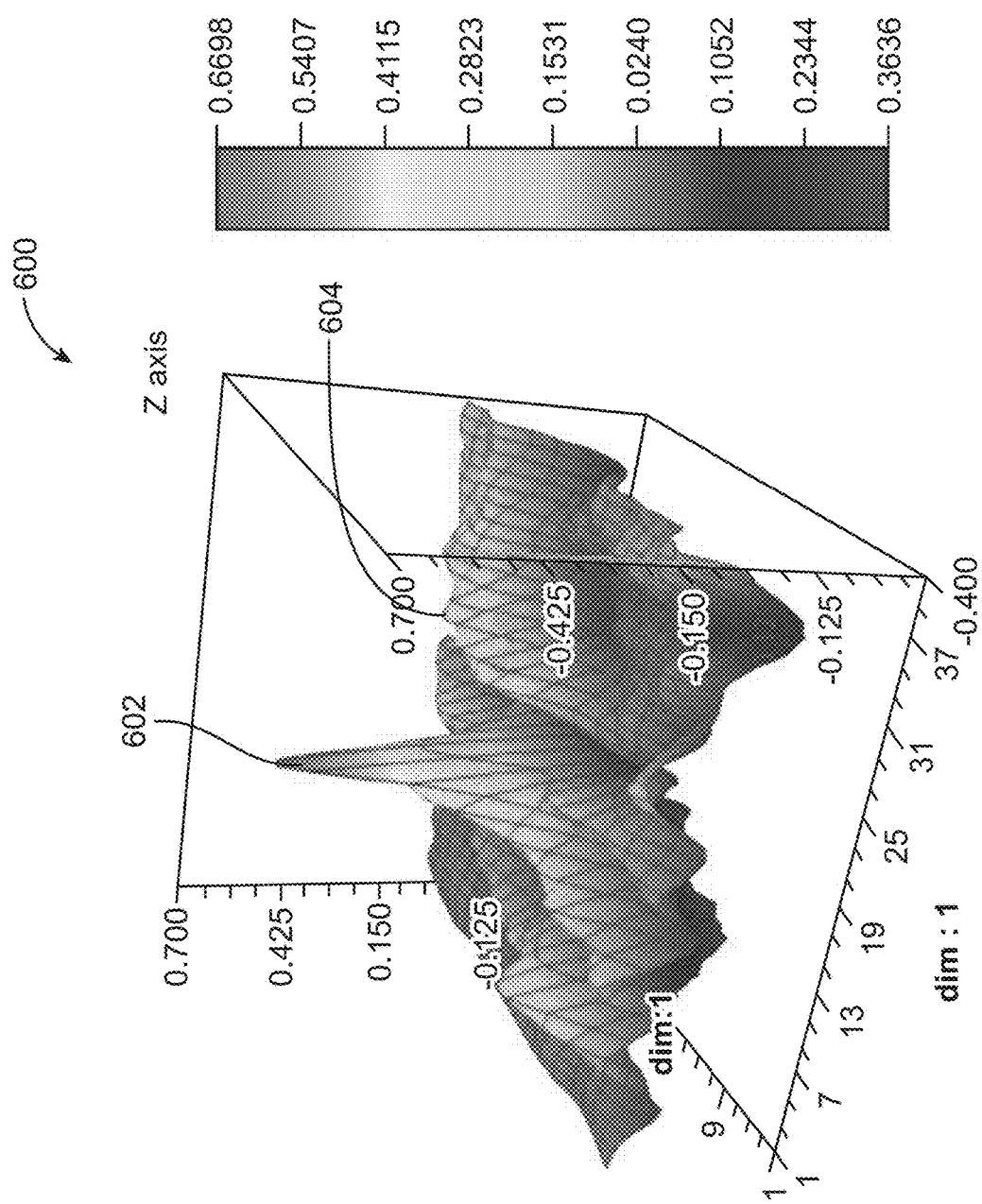
FIG. 6 illustrates an example of a match score surface in accordance with some embodiments.

In one implementation, the processor may determine match scores between the template image 214 and the processed image 222 at different offsets relative to each other. For example, the template image 214 may be positioned (mathematically) at different offsets relative to the processed image 222, covering a search ROI. As shown in FIG. 6, the match scores may define a match score surface 600 over a search region. As shown in the figure, the match score surface 600 may have a peak 602 and at least one sidelobe 604. In some embodiments, the values in the match score surface 600 may optionally be normalized, with the highest peak 602 having a value of 1.0.

In some cases, the fact that there is a peak in the match score surface 600 may not represent that the object(s) of interest is in the processed image 222. In other words, the peak 502 in the match score surface 600 may not represent a "true" match between the processed image 222 and the template image 214. This is because the above technique of determining the match score surface 600 will always result in a peak 602 in the match score surface 600, regardless of whether there is a "true match". Thus, in some embodiments, it may be desirable to determine whether the peak 602 represents a match between the processed image 222 and the template image 214.

To accomplish this, in some embodiments, the processor may determine how much the peak 602 stands out relative to the sidelobe(s) 604. For example, in one implementation, the processor may be configured to determine a peak-to-sidelobe ratio by dividing the value of the peak 602 by the value of the sidelobe 604. In another embodiment, the processor may determine a standard deviation of the sidelobe(s) 604, and determining a peak-to-sidelobe ratio by dividing the value of the peak 602 by the standard deviation of the sidelobe(s) 604. After the peak-to-sidelobe ratio is determined, the processor may then compare the peak-to-sidelobe ratio with a threshold to determine whether there is a match between the processed image 222 and the template image 214. If the peak-to-sidelobe ratio exceeds the threshold, then the processor may determine that the target (object of interest) is present. Otherwise, the processor may determine that the target is absent. If the target is present, the position of the peak 602 may be used as the position of the target. In some embodiments, the threshold may be determined based on sidelobe statistics for a given image, such as that shown in FIG. 7 and discussed herein. Alternatively, the threshold may be determined based on sidelobe statistics for multiple images.

Also, as discussed, in some embodiments, the processor may compare the processed image 222 with several template images 214 that are adjacent (in terms of orientation/gantry angles) next to the processed image 222 to account for slight rotation of the object of interest. In such cases, for each of the template images 214, the processor may determine a corresponding peak-to-sidelobe ratio. The processor may also select the template image having the highest peak-to-sidelobe ratio as the matched template image, and use the position of the peak 602 in such template image as the position of the target.

In one or more embodiments, the processor (e.g., the processor 54, or another processor) may be configured to automatically identify the sidelobe(s) 604. For example, in some embodiments, the processor may be configured to exclude the peak 602 and its vicinity from the match score surface 600, and the remaining surface will have the sidelobe(s) 604, and not the peak 602. In some embodiments, the processor may determine a mask to exclude the peak 602. For example, the processor may determine the mask by cross correlating the template image 214 with itself at different offsets to obtain an autocorrelation surface. Then the processor identifies locations where the autocorrelation surface exceeds a threshold value. For example, the threshold value may be anywhere between 0.1 and 0.3, or more preferably anywhere between 0.15 and 0.25 (e.g., 0.2). All values in the match score surface 600 exceeding the threshold value will be parts of an exclusion zone. When the exclusion zone is applied to the match score surface 600, the peak 602 and its vicinity will be removed.

Alternatively, the processor may identify locations where the autocorrelation surface is below a threshold value. For example, the threshold value may be anywhere between 0.1 and 0.3, or more preferably anywhere between 0.15 and 0.25 (e.g., 0.2). All values in the match score surface 600 that are below the threshold value will be parts of an acceptance zone. When the acceptance zone is applied to the match score surface 600, the sidelobe(s) 604 will remain as parts of the remaining surface, while the peak 602 and its vicinity will be removed. In such cases, the mask represents the acceptance zone, not the exclusion zone.

In one or more embodiments, the mask (which may represent an exclusion zone or an acceptance zone) may be stored in a non-transitory medium. For example, the mask may be saved as a list of (X, Y) coordinates, with (0, 0) referenced to the peak position.

Figure 7:
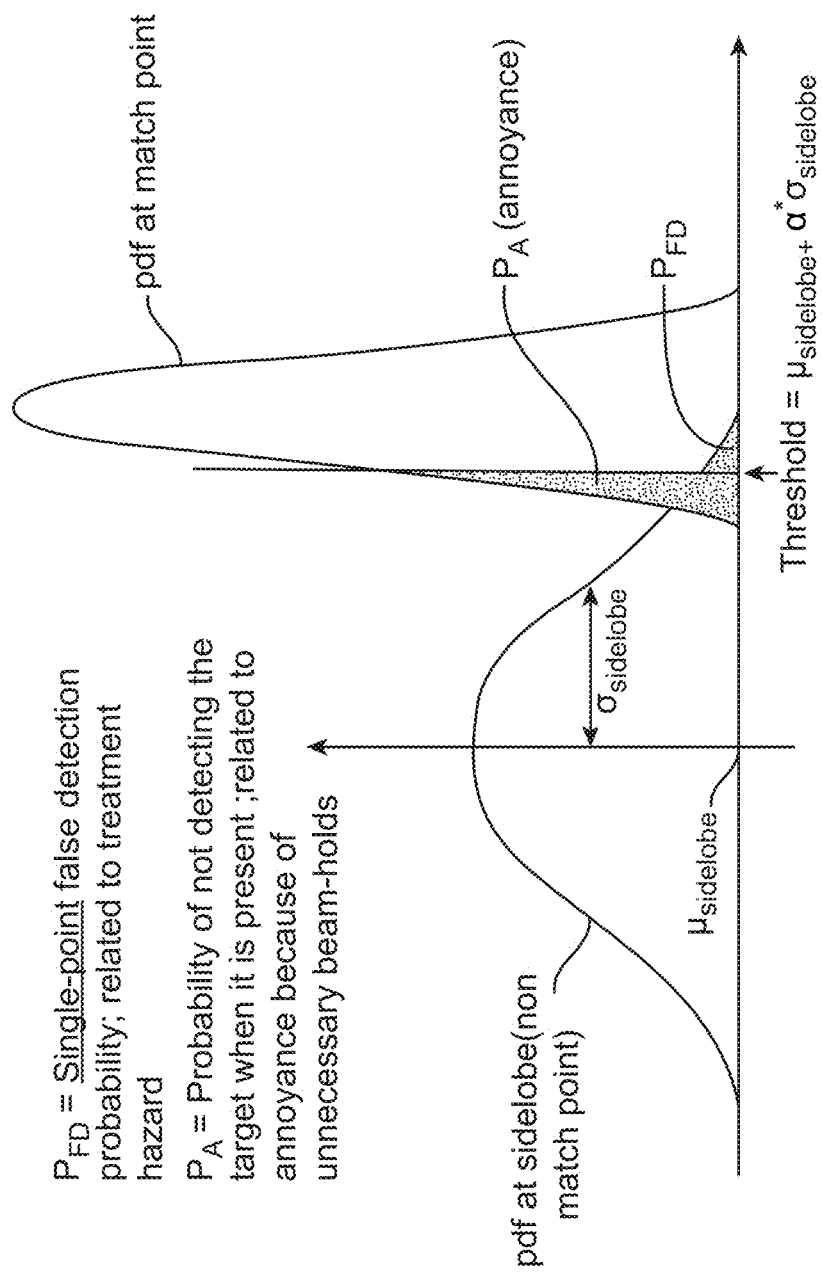
FIG. 7 illustrates a threshold parameter that affects false detection probability and probability of missing a target.

As shown in FIG. 7, the threshold determines the probability $P_{FD}$ of falsely detecting a target at a non-target point in the search region. The threshold also determines the probability $P_A$ of missing a target that is in fact present.

In the above embodiments, the object(s) of interest has been described with reference to the marker 400. The marker 400 may have an elongate configuration, a spherical configuration, an elliptical configuration, a random three-dimensional configuration, or any of other configurations. In other embodiments, the object(s) of interest may be a plurality of markers. In such cases, the VOI (e.g., the cylindrical geometry 420) may include voxels that are within contours 402 of the markers drawn by the user in each of the slices of the volumetric image 210. Accordingly, the resulting template image(s) 214 obtained from the method 300 of FIG. 3 will include images of the markers 400. When such template image(s) 214 is used in the template matching process 206 of FIG. 2, the processed image 222 will be compared with the template image(s) based on the group of markers 400 as if they are a single object.

Figure 8:
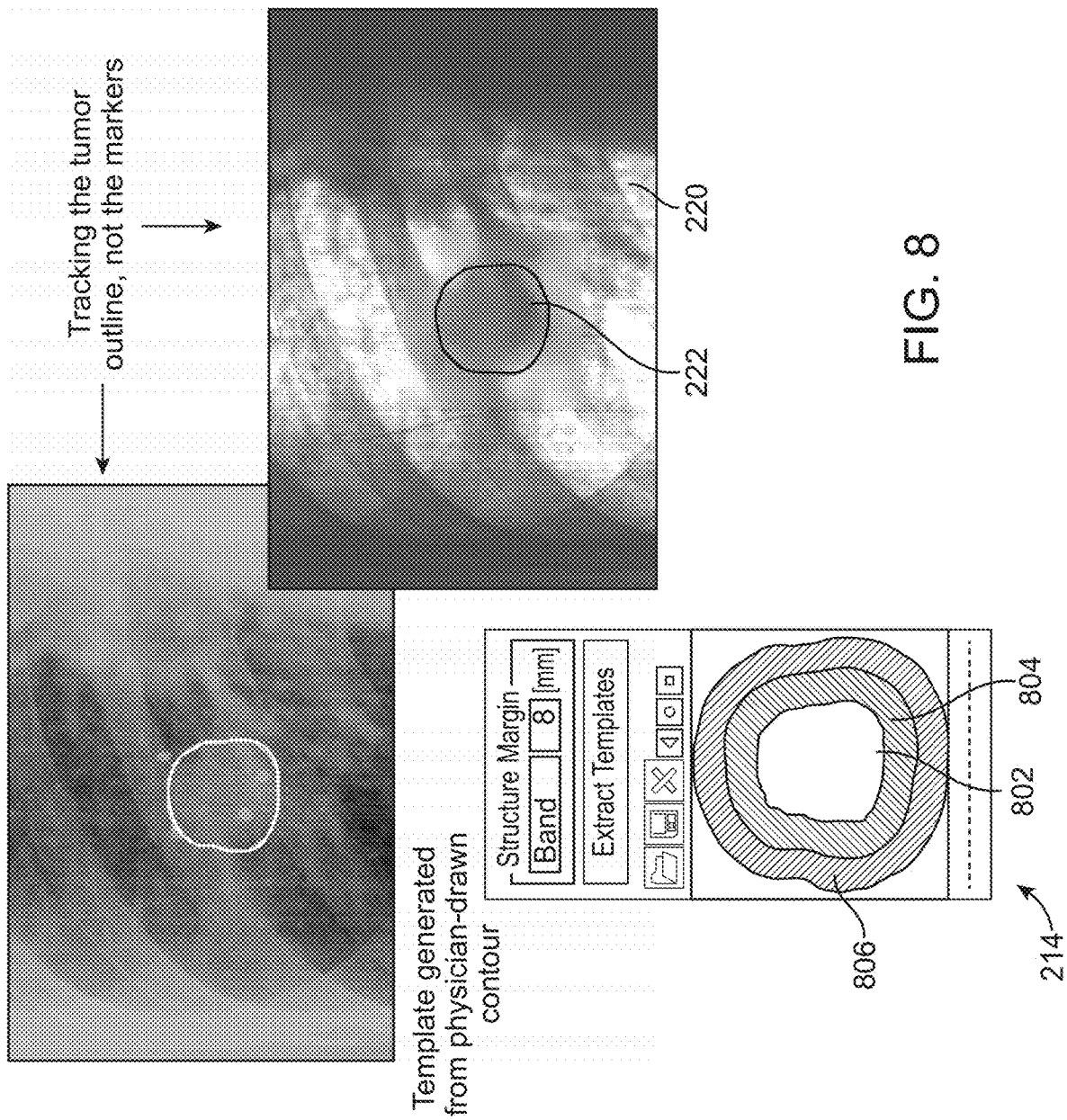
FIG. 8 illustrates a technique for performing tracking without using implanted markers.

Also, in other embodiments, the object(s) of interest may be a tissue structure (markerless fiducial). In such cases, the template image(s) 214 may be generated so that it has features that correspond with the tissue structure. For example, as shown in FIG. 8, in some embodiments, the template image 214 may include a region 802 having a shape that resembles the tissue structure. The template image 214 may also include a first layer/region 804 surrounding the region 802, and a second layer/region n806 surrounding the first layer/region 804. As shown in the figure, the regions 802, 804, 806 in the template image 214 have different respective colors/gray-scales.

Various techniques may be employed to generate the template image 214. In some embodiments, a person may review slices of a volumetric image (e.g., the volumetric image 210 of FIG. 2), and identify object of interest. The person may then create contours around the object of interest in the respective slices of the volumetric image. In some embodiments, the processor (e.g., the processor 54, or another processor) may be configured to receive the created contours as input 212 from the user, and automatically create a three-dimensional model based on the input 212. In some embodiments, the three-dimensional model may have a volume that is defined at least partially by the contours drawn by the person. For example, the volume of the three-dimensional model may have a surface that intersects the created contours. Also, in some embodiments, the three-dimensional model may further include a first layer created automatically by the processor so that the first layer surrounds the volume, and a second layer created automatically by the processor so that the second layer surrounds the first layer. The first layer may have a first pre-determined thickness, and the second layer may have a second pre-determined thickness. Also, the processor may assign all voxels inside the volume to have a first color/gray-scale (like the color shown in the region 802 in the template 214 in FIG. 8), all voxels inside the first layer to have a second color/gray-scale (like the color shown in the region 804 in the template 214), and all voxels inside the second layer to have a third color/gray-scale (like the color shown in the region 806 in the template 214). After the three-dimensional model is created, the three-dimensional model may be stored in a non-transitory medium for later processing.

During use, the input image 220 is received by the processor. In order to cross correlate with the input image 220, the processor reslices the three-dimensional contour in order to make a two dimensional contour parallel to the input image plane. The reslicing may, for example, be through a treatment isocenter (e.g., the center point of the tumor as identified by the user during planning). To match the geometry of the input image, the processor may be configured to forward project this two-dimensional contour. Then the processor may generate the two layers 802, 804 surrounding the contour in the forward projected contour image, thus resulting in a two-dimensional template (like the template 214 shown in the example of FIG. 8).

In some embodiments, when performing the method 200 based on markerless fiducial(s) (e.g., tissue structure), the input image 220 may be processed so that the processed image 222 looks like the template image 214. For example, in the image processing 204/500, the first filter 510 may be applied to highlight a boundary of tissue structure, and the second filter 520 may be applied to smooth the features inside the boundary of the tissue structure. As shown in the example of FIG. 8, using such technique, the input image 220 may be processed to achieve a processed image 222 having a smeared feature, so that the processed image 222 resembles the template image 214. In some embodiments, the first filter 510 may be a rolling ball filter, and the second filter 520 may be a low-pass filter (e.g., a median filter, an average filter, etc.). In other embodiments, the first filter 510 may be another type of filter. For example, in some embodiments that involve markerless fiducial(s), the first filter 510 may be any type of filter that is capable of enhancing a boundary of tissue structure. Also, for markerless fiducial(s), the second filter 520 may be a median filter in one implementation.

After the input image 220 is processed to obtain the processed image 222, and after the template image 214 has been obtained, the processed input image 222 is then compared with the template image 214 in the template matching process 206, like that described previously.

In other embodiments, the input image 220 may be a digital tomosynthesis (DTS) image that is made from multiple angularly adjacent projections rather than a single projection. Digital tomosynthesis image is an image (e.g., volumetric image) that is reconstructed using projection images, wherein the number of projection images involved may be less than those for a CT image. In such cases, the image processing 204 is optional, and the DTS input image 220 itself (e.g., a slice of the DTS input image 220) may be used for comparison with the template 214. In other embodiments, the image processing 204 may be performed to enhance a feature in the DTS input image 220 before the enhanced input image is compared with the template 214. The template 214 for comparison with the input image 220 may be a DTS image constructed from a CT volumetric image 210. In such cases the DTS image that forms the template 214 may be considered an "artificial" DTS image because it is not constructed according to conventional technique in which a DTS image is reconstructed from a plurality of projection images.

Figure 9A:
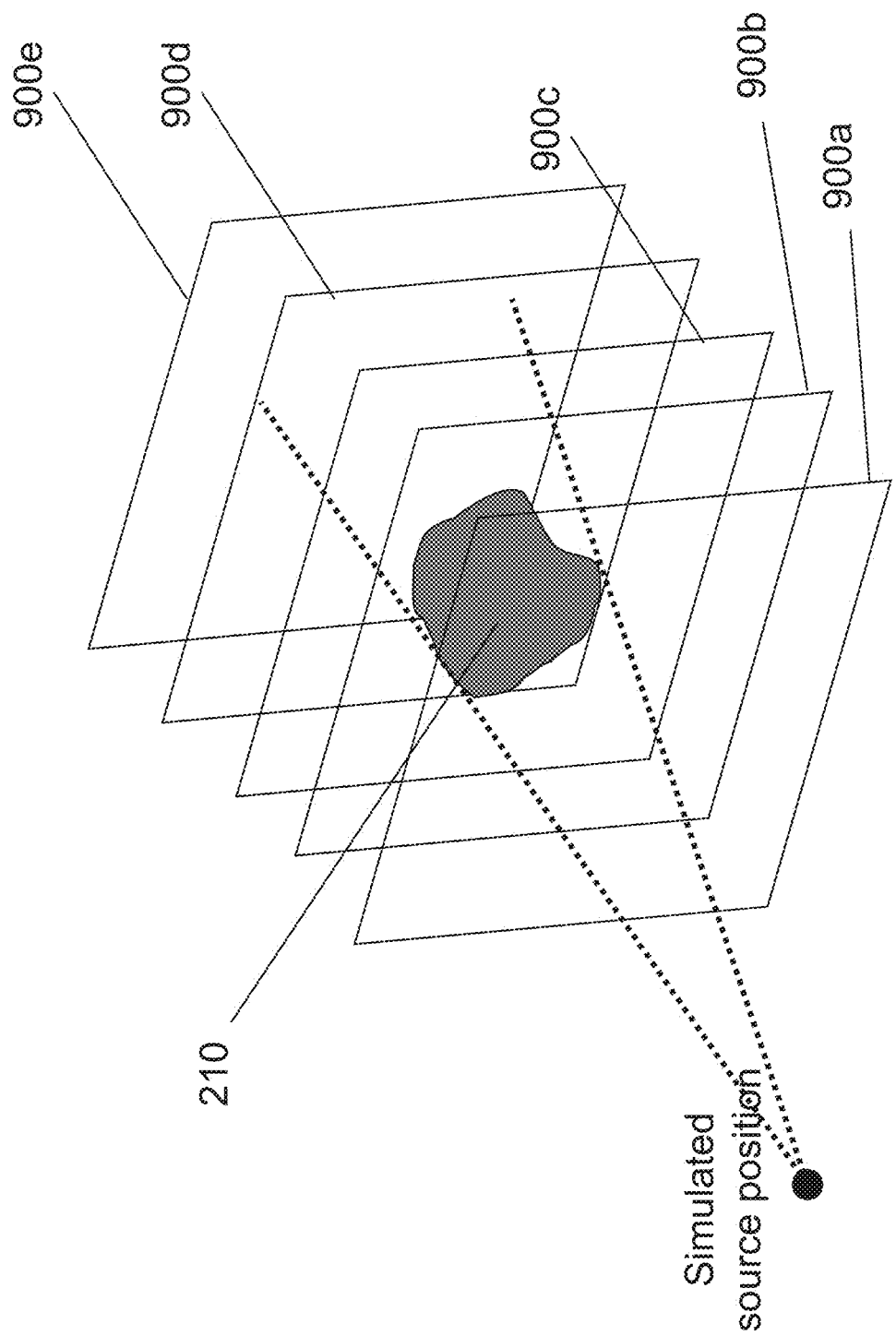
FIGS. 9A-9C illustrate a technique for generating a digital tomosynthesis image using a volumetric image in accordance with some embodiments.
Figure 9B:
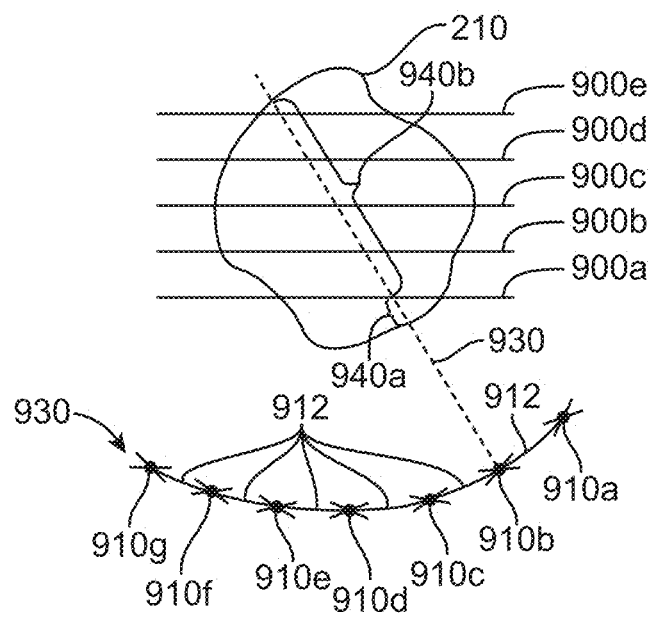

Various techniques may be used to obtain a set of artificial DTS images from a volumetric CT image. In some embodiments, the processor (e.g., the processor 54, or another processor) is configured to computationally forward project voxels (e.g., those in a region of interest as defined by a user) in the volumetric image 210 onto a set of intermediate planes to create image slices 900a-900e (FIG. 9A). In one technique, when performing the forward projection to create the image slices 900a-900e, the processor may mathematically move a simulated source along a trajectory (e.g., an arc path) partially around an object in the volumetric image 210 to different positions that correspond with the angular spacing of the projections used to form the online DTS image 220. Such technique is illustrated graphically in FIG. 9B. As shown in the figure, the forward projection is performed from different positions 910a-910g with angular spacing 912. In some embodiments, the angular spacing 912 may be equal to the angular spacing of the projections used to form the online DTS image 220. In other embodiments, the angular spacing 912 may be different from (e.g., greater than, or less than) the angular spacing of the projections used to form the online DTS image 220. To create a slice 900 (e.g., 900a), forward projection is performed from the different positions 910a-910g onto the plane of the slice 900 (e.g., the plane of slice 900a). For example, when performing forward projection from position 910b onto the plane of the image slice 900a, all points along the projection path 930 (including points 940a in front of the plane of the image slice 900a, and points 940b in the back of the plane of the image slice 900a) through the voxels of interest in the volumetric image 210 are projected onto the plane of the image slice 900a. Although one projection path 930 is shown in the example, it should be understood that there may be multiple projection paths 930 for any given position 910 that extend from the position 910 and that intersect the plane of the slice being created, thereby creating a two dimensional forward projection image onto the plane of the slice being created for any given position 910. Forward projections are also performed from other positions (e.g., 910a, 910c-910g) onto the plane of the image slice 900a. The forward projections at the plane of the image slice 900a are then summed to create the image slice 900a. The same technique may be repeated to create other image slices 900b-900e. Although five image slices 900a-900e are shown in the example, in other embodiments, there may be more than five image slices 900 or fewer than five image slices. In some cases, the image slices 900a-900e may be considered as corresponding to an intermediate stage of back projecting in a DTS reconstruction algorithm.

In some embodiments, the mathematically moving of a simulated source may be considered to have been performed by the processor when the processor has performed forward projection from multiple angular positions. Also, in some embodiments, when performing the forward projection, the arc center for the trajectory 930 of the simulated source may be the same as the arc center for the trajectory for obtaining the online DTS image 220. In addition, in some embodiments, the arc length for the trajectory of the simulated source may be the same as the arc length for the trajectory for obtaining the online DTS image 220. In other embodiments, the arc length for the trajectory of the simulated source may be different from (e.g., longer than) the arc length for the trajectory for obtaining the online DTS image 220 for achieving better depth resolution.

In some embodiments, after the image slices 900a-900e are formed, the image slices 900a-900e themselves may be used as templates 214. In other embodiments, the image slices 900a-900e may be deblurred to create respective deblurred image slices, and the deblurred image slices are then used as templates 214.

Figure 9C:
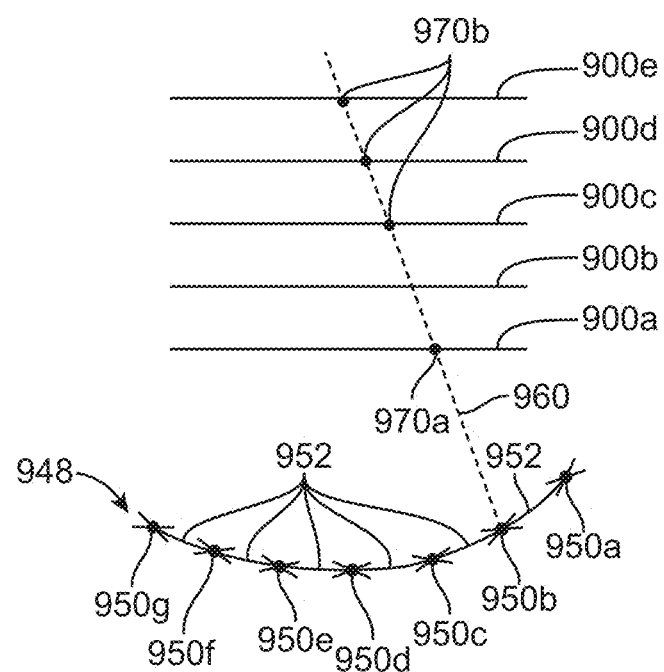

Various techniques may be employed to de-blur the image slices 900a-900e. In some embodiments, to de-blur a slice 900, the processor may determine a blur image contributing from objects in other slices, and may subtract this blur image from the slice 900 being deblurred. For example, to de-blur image slice 900b, other slices 900a and 900c-900e are forward projected onto the plane of the image slice 900b, and are then summed to create a blur image for the image slice 900b. FIG. 9C illustrates this technique. As shown in the figure, to create a blur image for slice 900b, the processor (e.g., the processor 54, or another processor) is configured to computationally forward project pixels in the other image slices 900a and 900c-900e onto the plane of the image slice 900b. In one technique, when performing the forward projection to create the blur image, the processor may mathematically move a simulated source along a trajectory 948 (e.g., an arc path) partially around an object of interest to different positions that correspond with the angular spacing of the projections used to form the online DTS image 220. As shown in the figure, the forward projection is performed from different positions 950a-950g with angular spacing 952. In some embodiments, the angular spacing 952 may be equal to the angular spacing of the projections used to form the online DTS image 220. In other embodiments, the angular spacing 952 may be different from (e.g., greater than, or less than) the angular spacing of the projections used to form the online DTS image 220. Also, in some embodiments, the angular spacing 952 for generating the blur image may be the same as the angular spacing 912 for generating the image slices 900. In other embodiments, the angular spacing 952 for generating the blur image may be different from the angular spacing 912 for generating the image slices 900. To create the blur image for the image slice 900b, forward projection is performed from the different positions 950a-950g onto the plane of the image slice 900b. For example, when performing forward projection from position 950b onto the plane of the image slice 900b, all points along the projection path 960 (including points 970a in front of the plane of the image slice 900b, and points 970b in the back of the plane of the image slice 900b) at the different image slices 900a and 900c-900e are projected onto the plane of the image slice 900b. Although one projection path 960 is shown in the example, it should be understood that there may be multiple projection paths 960 for any given position 950 that extend from the position 950 and that intersect the plane of the slice being de-blurred, thereby creating a two dimensional forward projection image onto the plane of the slice being de-blurred for any given position 950. Forward projections are also performed from other positions (e.g., 950a, 950c-950g) onto the plane of the image slice 900b. The forward projections at the plane of the image slice 900b are then summed to create the blur image for the image slice 900b. The above technique may be repeated to create corresponding blur images for the other respective image slices 900a and 900c-900e.

In some embodiments, the mathematically moving of a simulated source during the de-blurring process may be considered to have been performed by the processor when the processor has performed forward projection from multiple angular positions. Also, in some embodiments, in the de-blurring process, the arc center for the trajectory of the simulated source may be the same as the arc center for the trajectory for obtaining the online DTS image 220. In addition, in some embodiments, the arc length for the trajectory of the simulated source may be the same as the arc length for the trajectory for obtaining the online DTS image 220. In other embodiments, the arc length for the trajectory of the simulated source may be different from (e.g., longer than) the arc length for the trajectory for obtaining the online DTS image 220.

After the blur image is obtained, the processor then subtracts the blur image from slice 900b to de-blur the slice 900b. The same process is performed to deblur the other slices (e.g., 900a, and 900c-900e) in the set to result in a set of deblurred image slices. In some embodiments, the deblurred image slices may be stored as the templates 214 in a non-transitory medium for later processing (e.g., template matching with the online image 220).

The above technique results in a set of deblurred slices 900a-900e that form a set of templates 214 for a given gantry angle. In some embodiments, the processor may select a center one of the deblurred slices 900a-900e (or one of the slices that is the closest to the center) to use for comparison with the online DTS image 220 (e.g., a corresponding slice in the online DTS image 220). In other embodiments, the processor may compare multiple slices of the template 214 to corresponding multiple slices of the online DTS image 220 to achieve a rough three-dimensional matching.

The above technique is better than another possible method in which CT voxels are forward projected all the way to simulate projection images (rather than the above-described intermediate images) for reconstruction of the reference DTS images, thus saving computation time and resources. Also, the above technique obviates the need to perform a back projection (like that required when a method of generating DRRs is used).

After the input DTS image 220 is obtained (and optionally processed to enhance a feature therein), and after the template image 214 has been obtained, the input image 220 is then compared with the template image 214 in the template matching process 206, like that described previously.

Computer System Architecture

Figure 10:
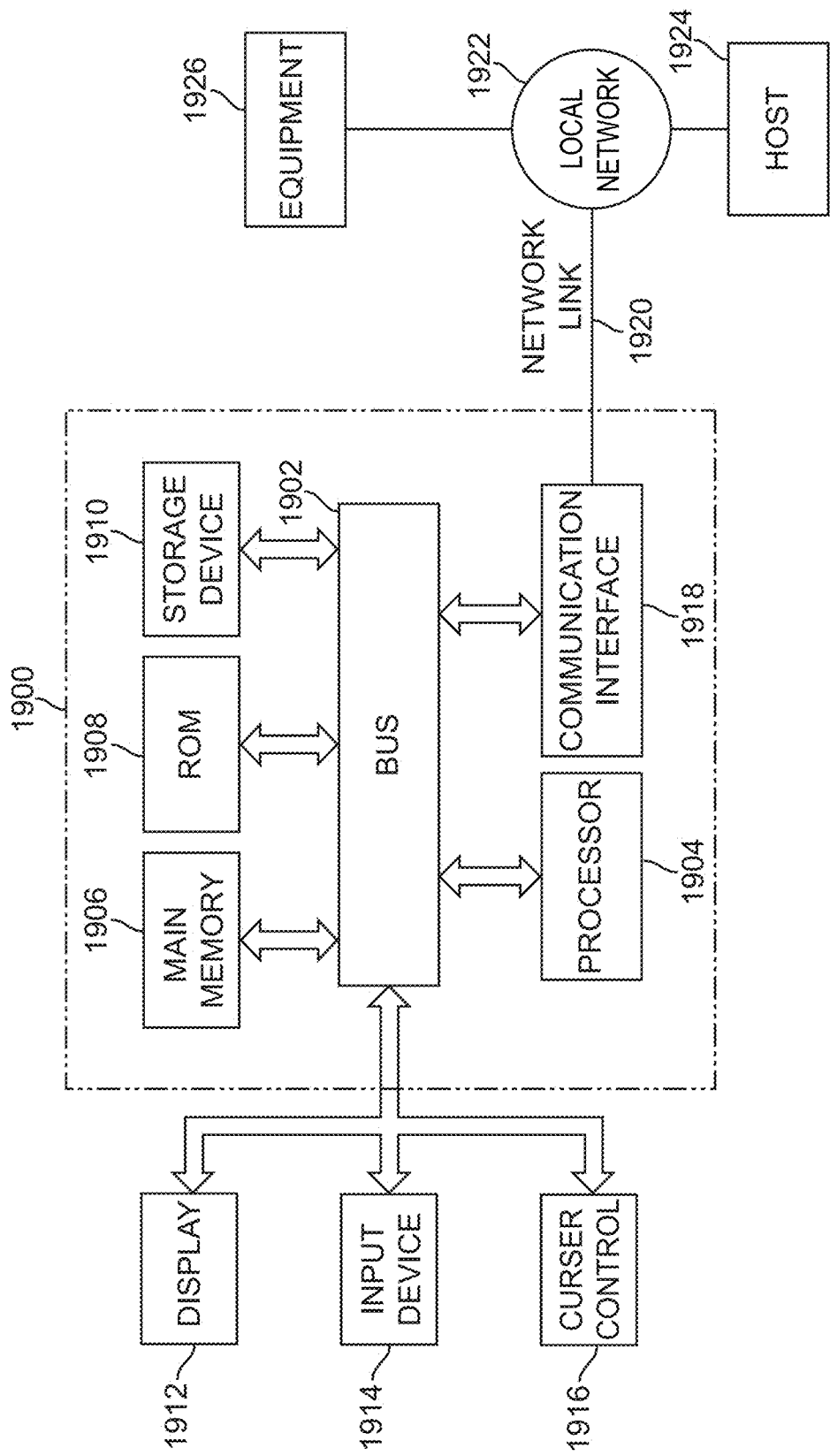
FIG. 10 illustrates a computer system with which embodiments described herein may be implemented in accordance with some embodiments.

FIG. 10 is a block diagram that illustrates an embodiment of a computer system 1900 upon which an embodiment of the invention may be implemented. Computer system 1900 includes a bus 1902 or other communication mechanism for communicating information, and a processor 1904 coupled with the bus 1902 for processing information. The processor 1904 may be an example of the processor 54 of FIG. 1, or another processor that is used to perform various functions described herein. In some cases, the computer system 1900 may be used to implement the processor 54 (or other processors described herein). The computer system 1900 also includes a main memory 1906, such as a random access memory (RAM) or other dynamic storage device, coupled to the bus 1902 for storing information and instructions to be executed by the processor 1904. The main memory 1906 also may be used for storing temporary variables or other intermediate information during execution of instructions to be executed by the processor 1904. The computer system 1900 further includes a read only memory (ROM) 1908 or other static storage device coupled to the bus 1902 for storing static information and instructions for the processor 1904. A data storage device 1910, such as a magnetic disk or optical disk, is provided and coupled to the bus 1902 for storing information and instructions.

The computer system 1900 may be coupled via the bus 1902 to a display 1912, such as a cathode ray tube (CRT) or a flat panel, for displaying information to a user. An input device 1914, including alphanumeric and other keys, is coupled to the bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The computer system 1900 may be used for performing various functions (e.g., calculation) in accordance with the embodiments described herein. According to one embodiment, such use is provided by computer system 1900 in response to processor 1904 executing one or more sequences of one or more instructions contained in the main memory 1906. Such instructions may be read into the main memory 1906 from another computer-readable medium, such as storage device 1910. Execution of the sequences of instructions contained in the main memory 1906 causes the processor 1904 to perform the process steps described herein. One or more processors in a multi-processing arrangement may also be employed to execute the sequences of instructions contained in the main memory 1906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to the processor 1904 for execution. Such a medium may take many forms, including but not limited to, non-volatile media, volatile media, and transmission media. Non-volatile media includes, for example, optical or magnetic disks, such as the storage device 1910. A non-volatile medium may be considered as an example of a non-transitory medium. Volatile media includes dynamic memory, such as the main memory 1906. A volatile medium may be considered as another example of a non-transitory medium. Transmission media includes coaxial cables, copper wire and fiber optics, including the wires that comprise the bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1904 for execution. For example, the instructions may initially be carried on a magnetic disk of a remote computer. The remote computer can load the instructions into its dynamic memory and send the instructions over a telephone line using a modem. A modem local to the computer system 1900 can receive the data on the telephone line and use an infrared transmitter to convert the data to an infrared signal. An infrared detector coupled to the bus 1902 can receive the data carried in the infrared signal and place the data on the bus 1902. The bus 1902 carries the data to the main memory 1906, from which the processor 1904 retrieves and executes the instructions. The instructions received by the main memory 1906 may optionally be stored on the storage device 1910 either before or after execution by the processor 1904.

The computer system 1900 also includes a communication interface 1918 coupled to the bus 1902. The communication interface 1918 provides a two-way data communication coupling to a network link 1920 that is connected to a local network 1922. For example, the communication interface 1918 may be an integrated services digital network (ISDN) card or a modem to provide a data communication connection to a corresponding type of telephone line. As another example, the communication interface 1918 may be a local area network (LAN) card to provide a data communication connection to a compatible LAN. Wireless links may also be implemented. In any such implementation, the communication interface 1918 sends and receives electrical, electromagnetic or optical signals that carry data streams representing various types of information.

The network link 1920 typically provides data communication through one or more networks to other devices. For example, the network link 1920 may provide a connection through local network 1922 to a host computer 1924 or to equipment 1926 such as a radiation beam source or a switch operatively coupled to a radiation beam source. The data streams transported over the network link 1920 can comprise electrical, electromagnetic or optical signals. The signals through the various networks and the signals on the network link 1920 and through the communication interface 1918, which carry data to and from the computer system 1900, are exemplary forms of carrier waves transporting the information. The computer system 1900 can send messages and receive data, including program code, through the network(s), the network link 1920, and the communication interface 1918.

It should be noted that, as used in this specification, the term "image" is not necessarily limited to image that is displayed, and may refer to image that is not displayed as well. For example, in some embodiments, any of the images described herein (e.g., input image 220, processed image 222, volumetric image 210, template image 214, etc.) may be stored in a non-transitory medium as image data.

Also, the term "processor" may include one or more processing units, and may refer to any device that is capable of performing mathematical computation implemented using hardware and/or software. The term "processor" may also refer to software stored in a non-transitory medium in other embodiments. Further, in any of the embodiments described herein, instead of using the processor 54 to perform the various functions described, a separate processor may be used.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method of generating a template image, comprising:
   receiving an input from a user, the input comprising object identification of bodily tissue in a volumetric image, the volumetric image having multiple slices;
   determining a volume-of-interest (VOI) to include voxels corresponding to a subset of the volumetric image of the bodily tissue, wherein a size of the VOI is less than a size of the volumetric image; and
   determining the template image using at least some of the voxels in the VOI, wherein the act of determining the template image comprises performing a forward projection of the at least some of the voxels in the VOI using a processor;
   wherein the act of performing the forward projection comprises forward projecting the voxels in the VOI while excluding one or more voxels outside the VOI;
   wherein the VOI is determined before the forward projection is performed, and wherein at least a part of the VOI has a cross sectional shape that is the same along a rotational axis of a gantry of a medical device; and
   wherein the VOI comprises a cylinder, and a cylindrical geometry of the VOI is defined based on one or more contours of the bodily tissue such that all voxels within the one or more contours are within the cylindrical geometry.

2. The method of claim 1, wherein the forward projection comprises a forward maximum intensity projection of the at least some of the voxels in the VOI.

3. The method of claim 1, wherein the forward projection comprises a forward average projection of the at least some of the voxels in the VOI.

4. The method of claim 1, wherein the forward projection comprises a forward median projection of the at least some of the voxels in the VOI.

5. The method of claim 1, wherein the act of determining the template image further comprises resampling voxels in the VOI into image planes that are parallel to a plane of an input image before the forward projection is performed.

6. The method of claim 1, wherein the template has an image feature that is similar to that in a DTS image.

7. The method of claim 1, wherein act of determining the template comprises forward projecting the at least some of the voxels in the VOI to different image slices that are parallel to each other.

8. The method of claim 7, wherein the act of determining the template further comprises performing a de-blurring procedure for each of the image slices.

9. The method of claim 1, wherein the cross sectional shape is perpendicular to the rotational axis.

10. A computer product having a non-transitory medium storing a set of instructions, an execution of which causes a method to be performed, the method comprising:
    receiving an input from a user, the input comprising object identification of bodily tissue in a volumetric image, the volumetric image having multiple slices;
    determining a volume-of-interest (VOI) to include voxels corresponding to a subset of the volumetric image of the bodily tissue, wherein a size of the VOI is less than a size of the volumetric image; and
    determining a template image using at least some of the voxels in the VOI, wherein the act of determining the template image comprises performing a forward projection of the at least some of the voxels in the VOI;
    wherein the act of performing the forward projection comprises forward projecting the voxels in the VOI while excluding one or more voxels outside the VOI;
    wherein the VOI is determined before the forward projection is performed, and wherein at least a part of the VOI has a cross sectional shape that is the same along a rotational axis of a gantry of a medical device; and
    wherein the VOI comprises a cylinder, and a cylindrical geometry of the VOI is defined based on one or more contours of the bodily tissue such that all voxels within the one or more contours are within the cylindrical geometry.

11. The computer product of claim 10, wherein the forward projection comprises a forward maximum intensity projection of the at least some of the voxels in the VOI.

12. The computer product of claim 10, wherein the forward projection comprises a forward average projection of the at least some of the voxels in the VOI.

13. The computer product of claim 10, wherein the forward projection comprises a forward median projection of the at least some of the voxels in the VOI.

14. The computer product of claim 10, wherein the act of determining the template image further comprises resampling voxels in the VOI into image planes that are parallel to a plane of an input image before the forward projection is performed.

15. The computer product of claim 10, wherein the template has an image feature that is similar to that in a DTS image.

16. The computer product of claim 10, wherein act of determining the template comprises forward projecting the at least some of the voxels in the VOI to different image slices that are parallel to each other.

17. The computer product of claim 16, wherein the act of determining the template further comprises performing a de-blurring procedure for each of the image slices.

18. The computer product of claim 17, wherein the cross sectional shape is perpendicular to the rotational axis.

* * * * *